United States Patent [19]

Ackley

[11] Patent Number: 4,905,589
[45] Date of Patent: Mar. 6, 1990

[54] INK-JET SYSTEM FOR MARKING PELLET-SHAPED ARTICLES

[76] Inventor: E. Michael Ackley, 1273 N. Church St., Moorestown, N.J. 08057

[21] Appl. No.: 229,763

[22] Filed: Aug. 5, 1988

Related U.S. Application Data

[63] Continuation-in-part of Ser. No. 11,790, Feb. 6, 1987, abandoned.

[51] Int. Cl.⁴ ............................................. B41F 17/36
[52] U.S. Cl. ..................................... 101/35; 101/483; 198/384; 198/483.1
[58] Field of Search ................. 101/40, 37, 35, 426; 400/126; 198/483.1, 393, 384, 397

[56] References Cited

U.S. PATENT DOCUMENTS

| | | | |
|---|---|---|---|
| 2,859,689 | 11/1958 | Ackley | 101/35 |
| 2,931,292 | 4/1960 | Ackley | 101/37 |
| 2,961,087 | 11/1960 | Reading | 198/483.1 X |
| 3,084,781 | 4/1963 | Merrill | 198/384 X |
| 3,272,118 | 9/1966 | Ackley | 101/37 |
| 3,789,575 | 2/1974 | Bross | 53/160 |
| 3,910,183 | 10/1975 | Noren et al. | 101/41 |
| 3,933,239 | 1/1976 | Yoshida | 198/384 |
| 4,019,187 | 4/1977 | Omori et al. | 101/35 X |
| 4,029,006 | 6/1977 | Mercer | 101/35 |
| 4,077,317 | 3/1978 | Kiesewetter et al. | 101/37 |
| 4,126,219 | 11/1978 | Bross | 198/384 X |
| 4,189,996 | 2/1980 | Ackley, Sr. et al. | 101/40 X |
| 4,308,942 | 1/1982 | Ackley | 101/40 X |
| 4,369,702 | 1/1983 | Ackley | 101/40 |
| 4,377,971 | 3/1983 | Ackley | 101/40 |
| 4,378,564 | 3/1983 | Cross et al. | 400/126 X |
| 4,548,825 | 10/1985 | Voss et al. | 400/126 X |
| 4,632,028 | 12/1986 | Ackley | 198/384 X |

*Primary Examiner*—Clifford D. Crowder
*Attorney, Agent, or Firm*—Weiser & Stapler

[57] ABSTRACT

A pellet marking device which does not rely upon contact between the marking device and the pellets to be marked in the course of its operation makes use of a system for carrying the pellet-shaped articles to be imprinted, and an ink-jet system for applying the indicia to the articles as the articles are carried through the apparatus.

61 Claims, 9 Drawing Sheets

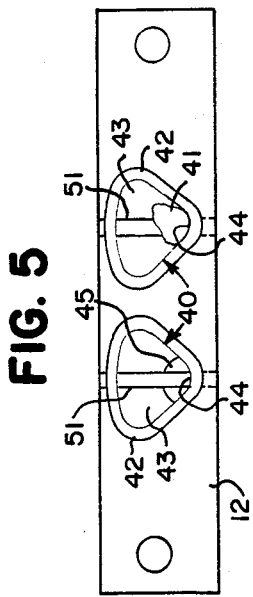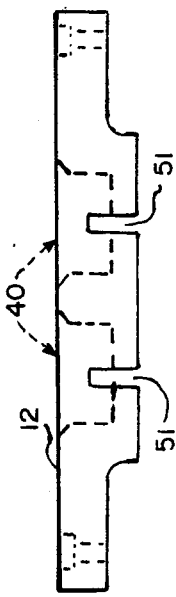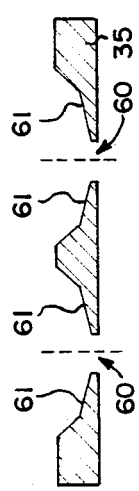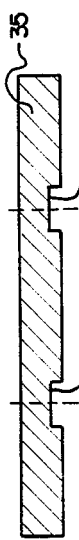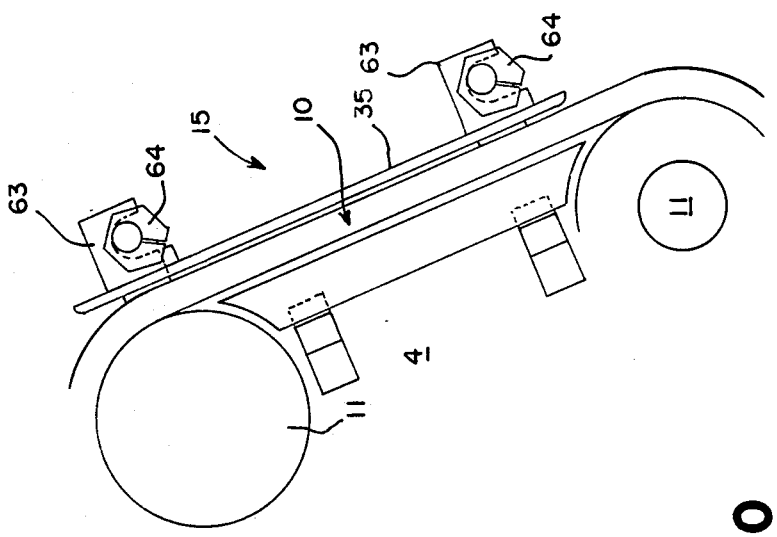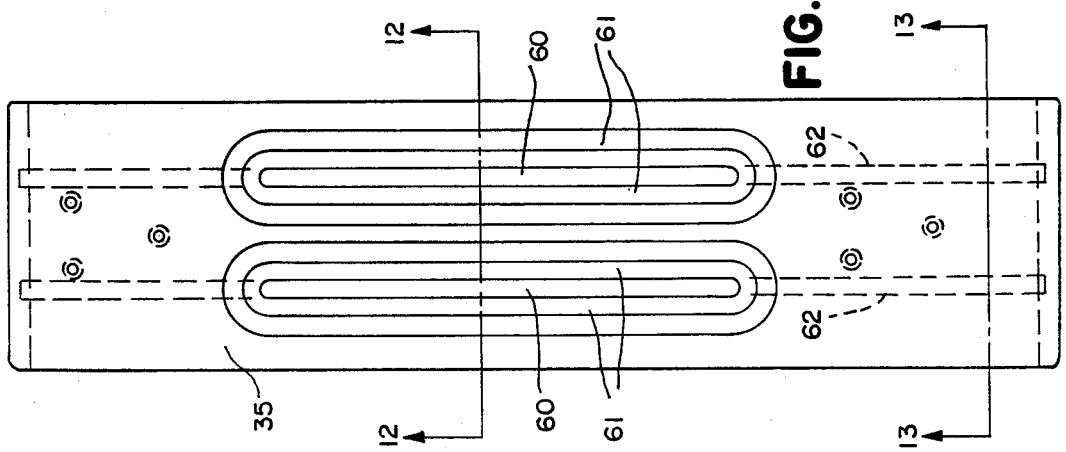

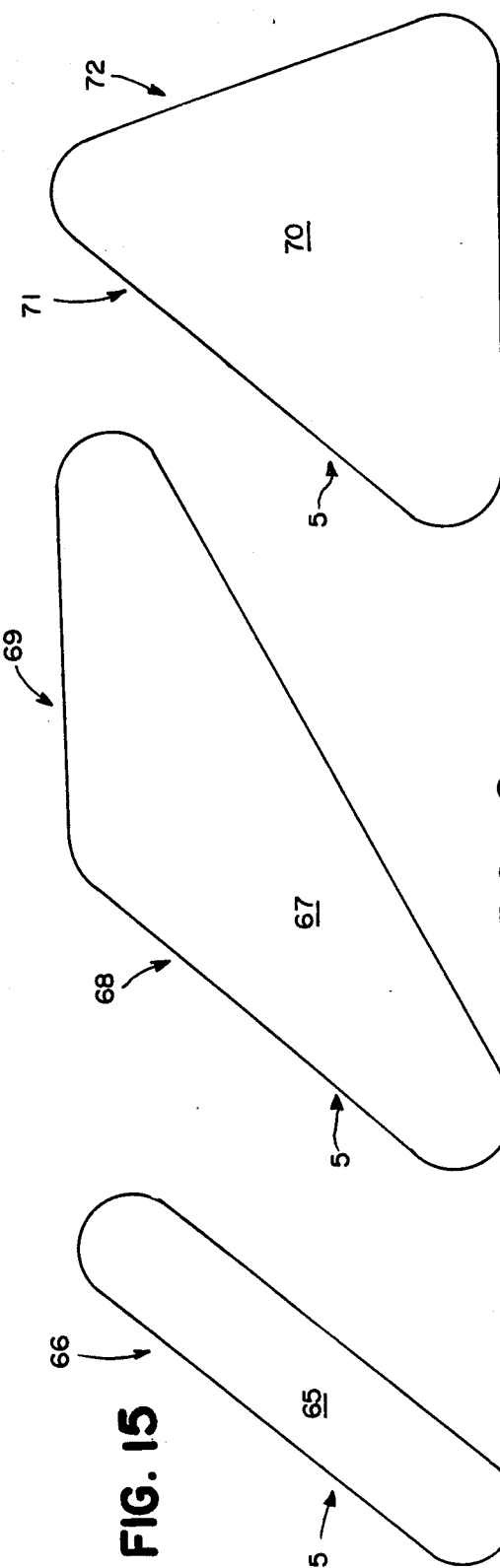

INK-JET SYSTEM FOR MARKING PELLET-SHAPED ARTICLES

This application is a continuation-in-part of application Ser. No. 07/011,790, filed Feb. 6, 1987, now abandoned.

BACKGROUND OF THE INVENTION

The present invention relates generally to pellet marking devices, and in particular, to a pellet marking device which makes use of an ink-jet system.

A variety of devices have been developed for applying desired indicia to pellet-shaped articles, including both regularly and irregularly shaped pellets. For example, U.S. Pat. No. 4,632,028; 4,500,012; 4,413,556; 4,394,933; 4,377,971; and 4,369,702 address various devices which may be used in applying indicia to articles such as candies, pharmaceutical capsules, tablets and the like, or any other pellet-shaped article to which identifying indicia are to be applied.

In terms of the means which are used to actually apply the indicia to these various articles, each of these devices, and the devices of the prior art, have conventionally made use of a contact-type printing system. To this end, a pair of rollers are provided including a design roll which forms the indicia to be applied to the articles, and which is disposed within an appropriate supply of ink, and a printing roll which is in contact with both the design roll and the articles which are to receive the indicia, for transferring the ink-laden indicia from the design roll to the articles in question. An exemplary description of such a device may be found in U.S. Pat. No. 4,528,904.

Each of the above-described pellet marking devices is therefore based upon a printing technique which requires direct contact between the printing assembly and the articles which are to receive the indicia. Often, contact between the printing device and the articles is beneficial in assuring that proper markings are transferred to the articles, and that the articles are maintained in proper position during this procedure. For example, direct contact between the printing device and the articles is often important in assuring that a sharp image is transferred to the product. In many cases, direct contact between the printing device and the articles is essential to such a transfer. This would particularly apply to the spin-printing of capsules, caplets and the like, since contact between the printing device and the articles which are to receive the indicia must be sufficient to cause the articles to spin within an appropriate carrier so that the desired indicia are properly applied about the circumference of the articles.

However, in some cases, the articles which are to receive the indicia have been found to be so fragile that a certain potential for breakage of the articles may arise in the course of the printing procedure. This problem most clearly manifests itself in the application of indicia to candies and the like, although similar problems may also be encountered in connection with certain pharmaceutical formulations, depending upon their consistencies. The contact pressure which is applied against such articles may be adjusted (reduced) in an effort to overcome this problem. However, this too presents a problem in that the resiliency of the printing roll tends to vary in use, causing changes over time. Moreover, this reduction in potential for breakage is achieved at the expense of less reliable printing, since contact between the printing device and the articles is reduced.

Such difficulties can result either in the incomplete application of indicia (partially or entirely) to the articles, at one extreme, or damage to the articles, at the other. These problems are further complicated when irregularly shaped pellets are to be marked, since the surface characteristics of such articles cannot be predicted, making the necessary penetration of the contacting printing device even more difficult to establish.

It therefore became desirable to develop an alternative to contact-type printing devices to enable the application of indicia to pellets which are unable to satisfactorily withstand the constraints of actual contact with the printing device.

SUMMARY OF THE INVENTION

It is therefore a primary object of the present invention to provide a device for applying indicia to pellet-shaped articles which does not require contact with the articles to be imprinted.

It is also an object of the present invention to provide a non-contacting pellet marking device which minimizes, or effectively eliminates the potential for breakage of the product in the course of the printing operation.

It is also an object of the present invention to provide a non-contacting pellet marking device which is capable of applying indicia to both regularly shaped and irregularly shaped pellets.

It is also an object of the present invention to provide a non-contacting pellet marking device which is capable of assuring that the desired indicia are completely and reliably applied to each of the pellet-shaped articles being processed.

It is also an object of the present invention to provide a non-contacting pellet marking device having the foregoing capabilities, yet which is simple in construction, maintenance and operation.

These and other objects are achieved in accordance with the present invention by providing a pellet marking device which does not rely upon contact between the marking device and the pellets to be marked in the course of its operation. This is accomplished by combining a suitable carrier system for the pellet-shaped articles to be imprinted with an ink-jet system for applying the indicia to the articles as the articles pass beneath the ink-jet printing head.

Previously, it would have been expected that the use of an ink-jet system to apply indicia to pellet-shaped articles would not produce a satisfactory result in view of various limitations inherent in the ink-jet system. For example, the lack of contact between the printing device and the pellets to receive the indicia makes reliable positioning of the articles extremely difficult. This would lead to the expectation that the indicia would not be reliably applied to each of the articles due to irregularities in their positioning. For similar reasons, an unacceptable decrease in the clarity of the transferred image would be expected.

Aggrevation of these problems would be expected when operating upon irregularly shaped pellets, such as candies or the like, or when using the types of dyes which the FDA has approved for use in connection with such applications. The FDA-approved dyes present a particularly difficult problem in conjunction with ink-jet printing systems in that they generally contain pigments and other diluents (or carrier) which must be approved for human consumption, but which tend to clog the very fine nozzles of the ink-jet printing system; more so than would ordinary dyes (which allow a greater leaway to alter the dye composition to facilitate spraying).

In accordance with the present invention, it has been found that these anticipated difficulties can be overcome by appropriately combining the ink-jet system with a pellet-conveying system which is especially configured to properly locate and maintain the pellet-shaped articles in proper position as they traverse the ink-jet system. For further detail regarding a pellet-shaped article marking apparatus in accordance with the present invention, reference is made to the detailed description which follows, taken in conjunction with the following illustrations.

BRIEF DESCRIPTION OF THE DRAWINGS

FIG. 5 is a top plan view of a carrier bar used in the apparatus of FIG. 1.

FIG. 6 is a side elevational view of the carrier bar of FIG. 5.

FIG. 10 is a top plan view of a guide for use in connection with the apparatus of FIG. 1.

FIG. 11 is a partial, side elevational view of an adjustment mechanism for the guide of FIG. 10.

FIG. 12 is a sectional view of the guide of FIG. 10, taken along line 12—12.

FIG. 13 is a sectional view of the guide of FIG. 10, taken along line 13—13.

FIGS. 15 to 17 are schematic representations of alternative embodiment conveying paths in accordance with the present invention.

In the several views provided, like reference numerals denote similar structure.

DETAILED DESCRIPTION OF THE PREFERRED EMBODIMENT

Figure 1:
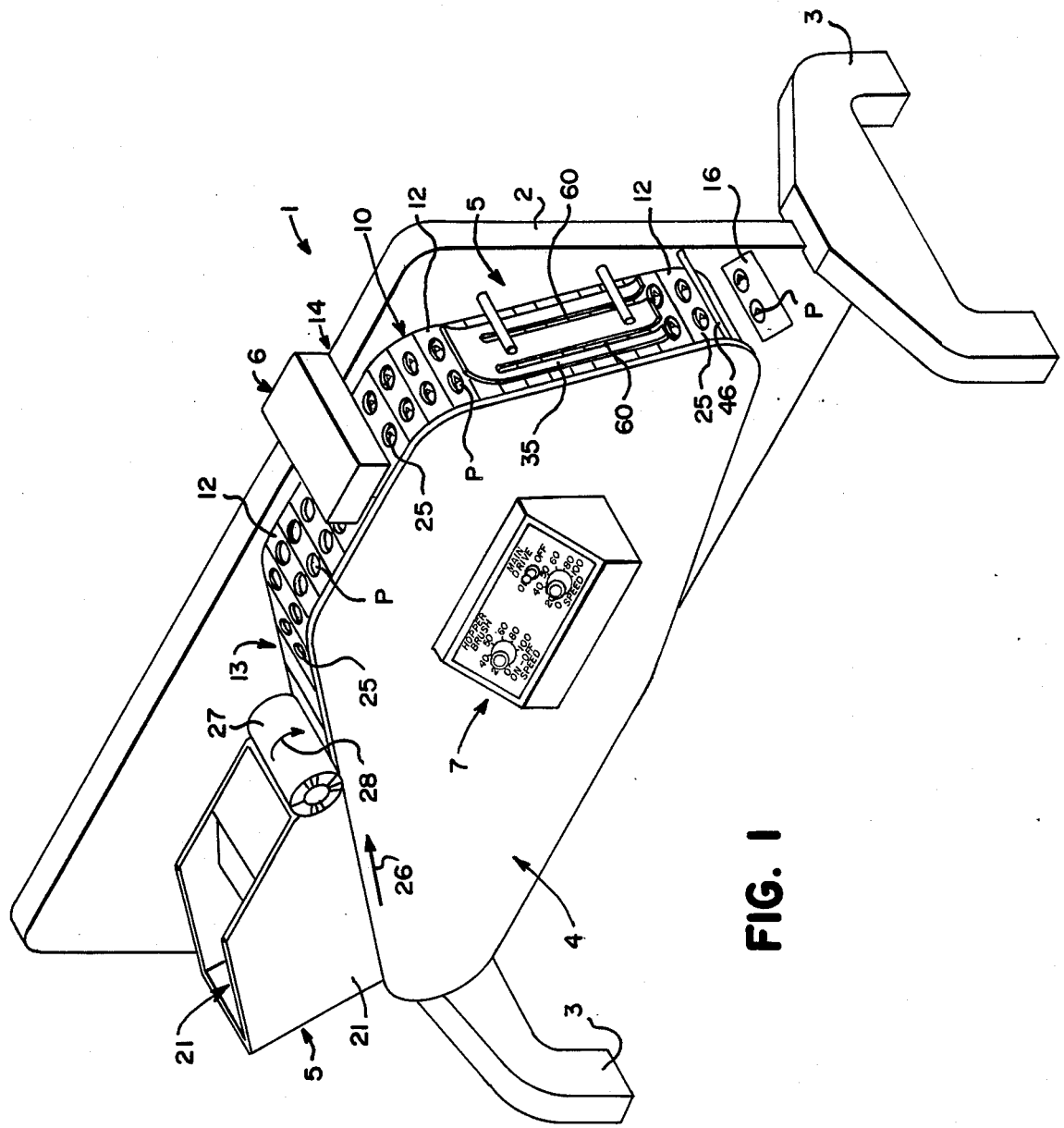
FIG. 1 is an isometric view of a pellet marking apparatus in accordance with the present invention.

FIG. 1 illustrates a pellet marking apparatus 1 for marking any of a variety of pellet-shaped articles with appropriate indicia. The pellet-shaped articles may be regularly shaped, such as capsules, caplets, pills, tablets and other spherical, oval or cylindrical shapes, as well as irregularly shaped articles. The indicia to be applied to these articles may be varied according to need, depending upon the markings which are to be applied to the articles, but will generally be of a food-grade, or even a pharmaceutical grade, in view of the anticipated uses for such indicia. For purposes of illustration, pellets (P), both marked and unmarked, are shown in FIG. 1 only.

The pellet marking apparatus 1 is supported upon a frame 2 having spaced legs 3 for providing a free standing support. Extending from the frame 2 is a conveyor mechanism 4 for conveying pellets through the apparatus 1 as will be discussed more fully below, a feed hopper 5 for receiving a supply of pellets and for delivering the pellets to the conveyor mechanism 4 in organized fashion, and a printing head 6 positioned at an appropriate location along the conveyor mechanism 4. Operation of the resulting assembly is advantageously regulated from a centrally located control panel 7.

Figure 2:
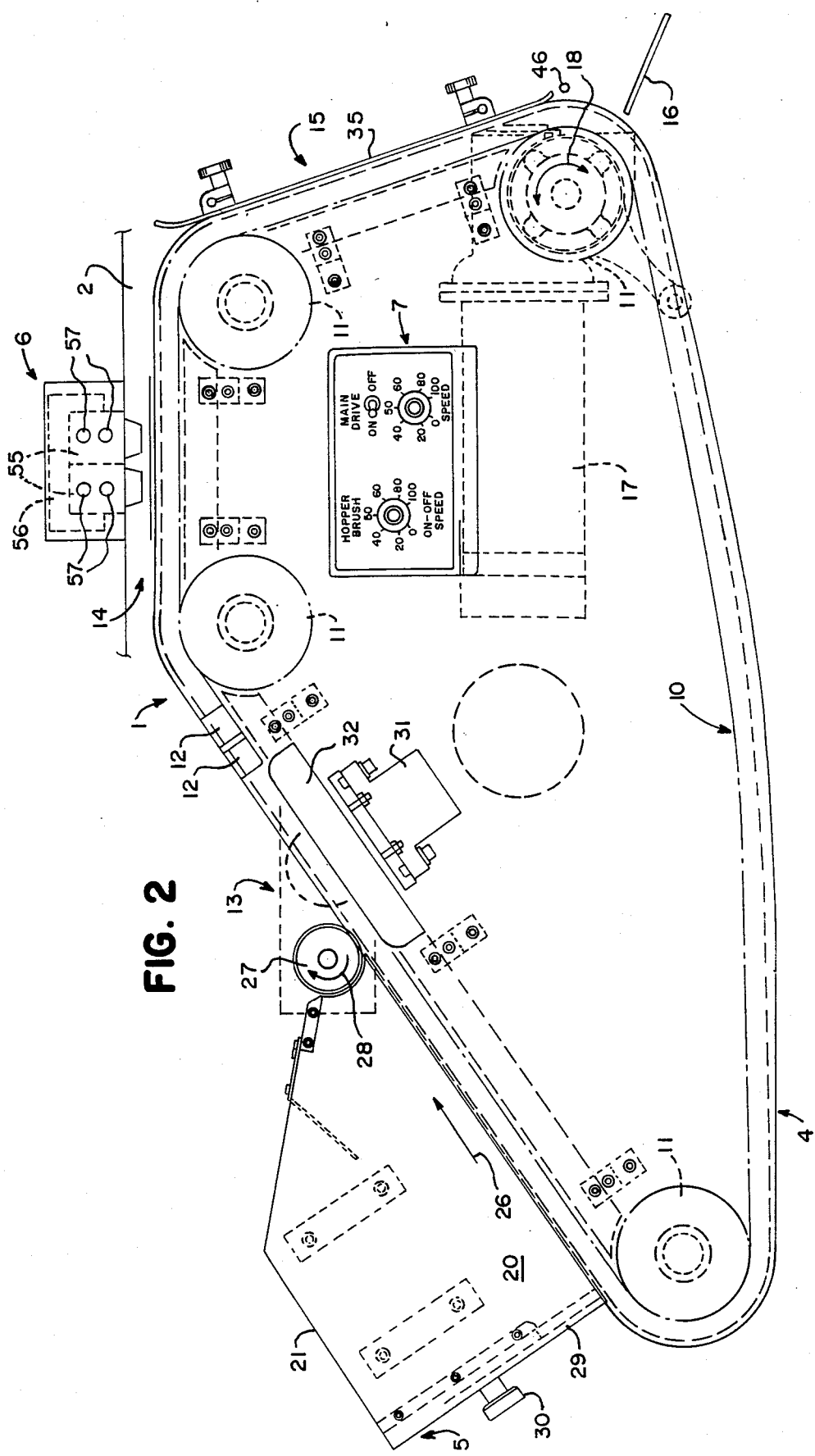
FIG. 2 is a side elevational view of the apparatus of FIG. 1.
Figure 3:
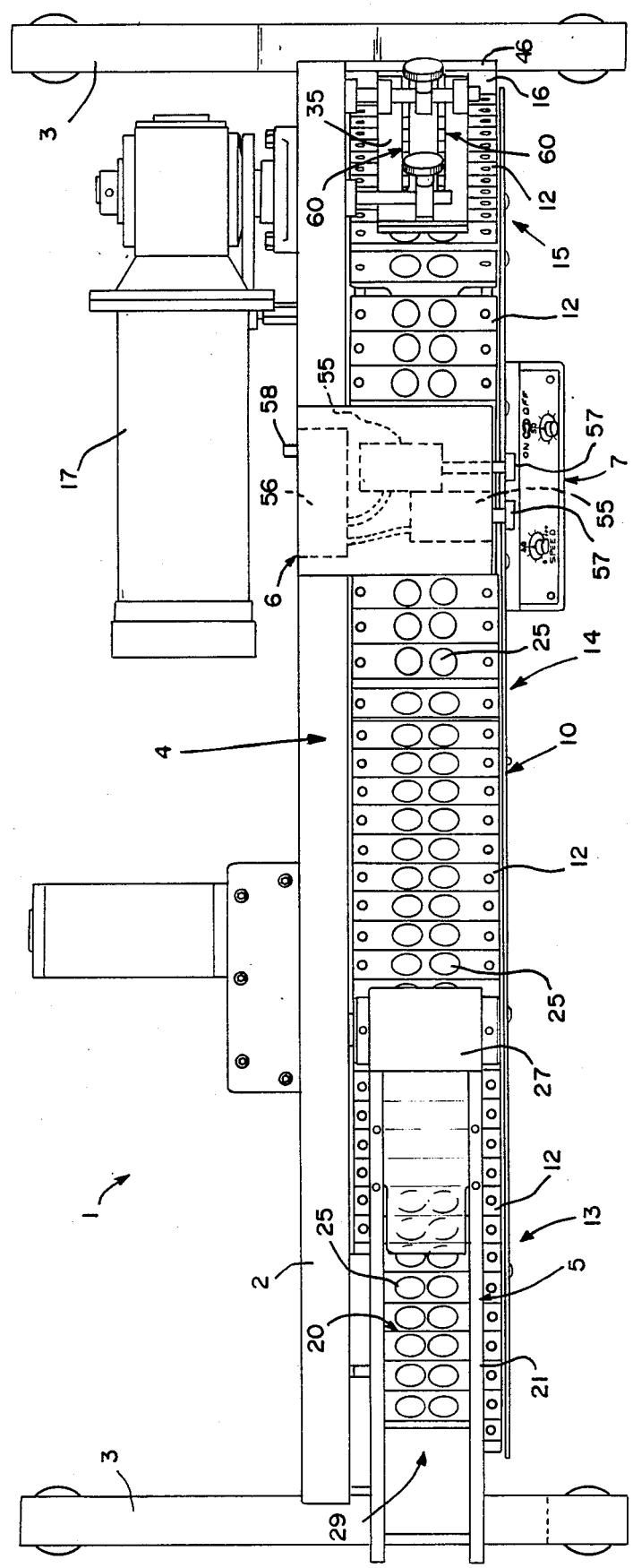
FIG. 3 is a top plan view of the apparatus of FIG. 1.
Figure 4:
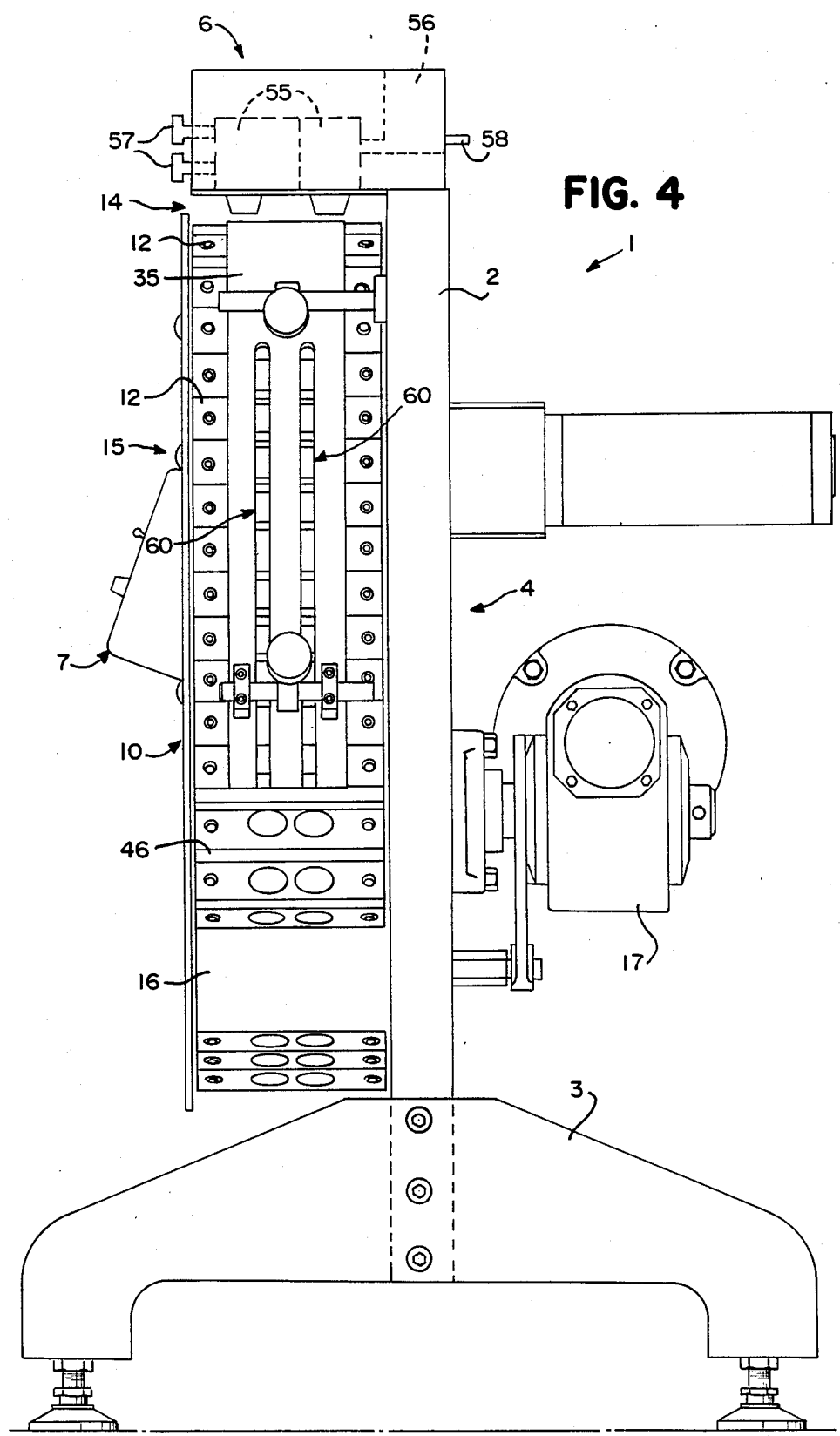
FIG. 4 is an end elevational view of the apparatus of FIG. 1.

Referring to FIGS. 2–4, the conveyor mechanism 4 takes the form of a continuous chain conveyor 10 disposed upon appropriately positioned sprockets 11. The chain conveyor 10 operates to receive a series of carrier bars 12 for collecting pellets from the feed hopper 5 and for conveying the collected pellets through the pellet marking apparatus 1. In the illustrative embodiment of FIGS. 2–4, the chain conveyor 10 forms a conveyor path which initially progresses along an inclined portion 13, extending from the feed hopper 5, and which then passes to a generally horizontal portion 14. Thereafter, the chain conveyor 10 passes through a declining portion 15, eventually reaching the discharge at 16. Return of the chain conveyor 10 from the declining portion 15 to the inclined portion 13 is unsupported, allowing a degree of slack in the chain conveyor 10 to accommodate irregularities in the system. An appropriate motor/gear-reduction unit 17 is provided to operate the chain conveyor 10, in the direction of the arrow 18.

The feed hopper 5 is adapted to receive a quantity of pellets for controlled delivery to the chain conveyor 10. Pellets are introduced to the feed hopper 5, filling the cavity 20 which is defined by the enclosure 21 of the feed hopper 5, and resting upon the carrier bars 12 of the chain conveyor 10. For this reason, and to maximize the number of pellets which may be processed through the pellet marking apparatus 1, the carrier bars 12 are advantageously attached to the chain conveyor 10 in relatively close, juxtaposed relationship to one another, forming a substantially continuous conveyor surface.

The carrier bars 12 are each provided with one or more pellet receiving pockets 25, disposed transversely along their length. Accordingly, as the carrier bars 12 are drawn beneath the feed hopper 5, the pockets 25 of the carrier bars 12 operate to receive and entrain pellets from the feed hopper 5, drawing the pellets along the conveyor mechanism 4 for further processing. To be noted is that although the carriers bars 12 illustrated in FIGS. 2–4 illustrate only two such pockets 25 for each carrier bar 12, for purposes of simplicity, the carrier bars 12 may be provided with any number of pockets 25 disposed along their length, as desired, enabling significant numbers of pellets to be processed in parallel.

Provided that a sufficient quantity of pellets is contained within the cavity 20 of the feed hopper 5, the pockets 25 of the carrier bars 12 will become filled with pellets as the conveyor mechanism 4 is drawn beneath the feed hopper 5, in the general direction of the arrow 26. Before proceeding from beneath the feed hopper 5, the carrier bars 12 and the pellets 25 which they contain will encounter a brush 27 which rotates in a direction opposite to the direction of transport of the pellets 25, as shown by the arrow 28. The brush 27 primarily operates to return pellets to the cavity 20 of the feed hopper 5 which have not been received within one of the pockets 25 of the carrier bars 12. However, the brush 27 also operates to effectively seat the pellets which have been received within the pockets 25 of the carrier bars 12, within their respective pockets. In this fashion, pellets are reliably transferred from the feed hopper 5 to the conveyor mechanism 4, for further processing. To be noted is that should it become desirable to remove pellets from the feed hopper 5, for cleaning or servicing of the unit, a trap door 29 is provided at the rear of the feed hopper 5 which is operable by lifting the knob 30 to relieve the feed hopper 5 of its contents.

The foregoing procedures will result in the entrainment of rows of pellets within the pockets 25 of the carrier bars 12 as the carrier bars 12 are conveyed along their desired path by the conveyor mechanism 4. For uniformity of result, it is important for the pellets to be received within the pockets 25 of the carrier bars 12 so that the pellets do not unnecessarily extend from the pockets 25 (i.e., sitting in the pockets on their ends). While the rotating brush 27 operates to achieve such a result, additional measures may be provided, if desired, to further assure that the pellets are properly seated within the pockets 25 of the carrier bars 12. One such measure is to provide an additional rotating brush, similar to the brush 27, along the inclined portion 13 of the chain conveyor 10. However, since this could potentially cause pellets to be thrown from the pockets 25, it is preferred to ensure seating of the pellets by locating a vibrator 31 beneath the inclined portion 13 of the chain conveyor 10 so that the carrier bars 12 are caused to encounter a vibrating surface 32 as the carrier bars 12 are drawn along the inclined portion 13 of the chain conveyor 10. This has the added advantage of freeing the inclined portion 13 of potentially interfering structures, for purposes which will become apparent from the description which follows.

Upon transferring the pellets from the feed hopper 5 to the pockets 25 of the carrier bars 12, it then remains to apply appropriate indicia to the pellets prior to their discharge from the marking apparatus 1, at 16. The configuration of the conveyor mechanism 4 which is selected for illustration in FIGS. 2-4 provides three different areas for accomplishing this result. The embodiment illustrated shows placement of the printing head 6 along the horizontal portion 14 of the chain conveyor 10. While this placement has been selected for ease of description and illustration, it will be seen from the description which follows that it is also possible to place the printing head 6 along the inclined portion 13 of the chain conveyor 10, or the declining portion 15 of the chain conveyor 10, as desired. It is even possible for multiple printing heads 6 to be placed along different portions of the chain conveyor 10 to allow multiple indicia (e.g., different markings, different colors, etc.) to be applied to the pellets as the pellets are conveyed through the marking apparatus 1. Further discussion of the printing head 6 will be provided below, based upon its placement along the horizontal portion 14 of the conveyor mechanism 4. Special considerations which might apply to placement of the printing head 6 at other locations along the chain conveyor 10 will be discussed where appropriate.

In any event, after receiving indicia from the printing head 6, the chain conveyor 10 will cause the pellets carried by the carrier bars 12 to progress to the declining portion 15 of the chain conveyor 10, for eventual discharge at 16. To make sure that the pellets do not fall from the carrier bars 12 in the course of traversing the declining portion 15 of the chin conveyor 10, a guide 35 is provided which adjustably overlies the declining portion 15 of the chain conveyor 10 so that the pellets are securely retained within the pockets 25 of the carrier bars 12, without damaging or otherwise marring the pellets in the course of this transfer.

To be noted is that in FIGS. 2-4, the pockets 25 of the carrier bars 12 are simply circular (hemispherical) in configuration. Often, this will be adequate to effectively receive and position pellets for processing as previously described. However, it has been found that appropriate modification of the configuration of the pockets of the carrier bars 12 can be effective in providing still further assurances that the pellets proceed through the pellet marking apparatus 1 in desired fashion. To this end, and with reference to FIGS. 5-8, the carrier bars 12 are preferably provided with configured pockets which are especially adapted to receive and seat the pellets which are received from the feed hopper 5, especially irregularly shaped pellets such as the pellet 41 shown in FIG. 5.

Figure 8:
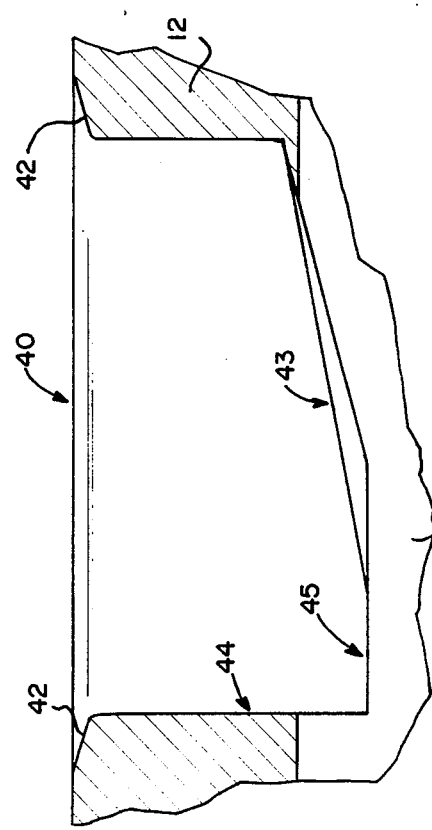
FIG. 8 is a sectional view of the pocket of FIG. 7, taken along line 8—8.
Figure 7:
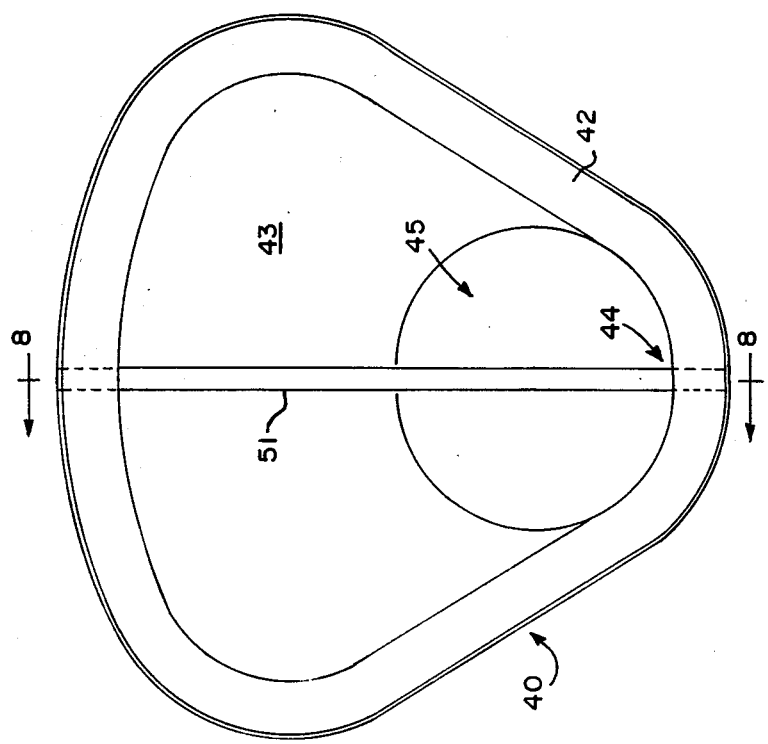
FIG. 7 is a top plan view of a pocket of the carrier bar of FIGS. 5 and 6.

Referring particularly to FIGS. 7 and 8, it is seen that the pellet receiving pockets 40 include tapered marginal portions 42 and a configured base 43. The tapered marginal portions 42 operate to facilitate transfer of the pellets from the feed hopper 5 to the pockets 40, as well as to avoid sharp edges which could potentially mar the pellets as they enter the pockets 40. The configured base 43 combines with the generally sector-shaped pocket 40 to urge a pellet toward the foot 44 of the pocket 40 so that the pellet comes to rest upon the generally circular bed 45 of the base 43. Such structure gives rise to a "funneling" effect which tends to direct pellets received within the pockets 40 toward the foot 44 and upon the bed 45, providing a known reference for use in applying indicia as will become apparent from the discussion which follows, and properly seating the pellet in this position during subsequent printing operations.

Figure 9:
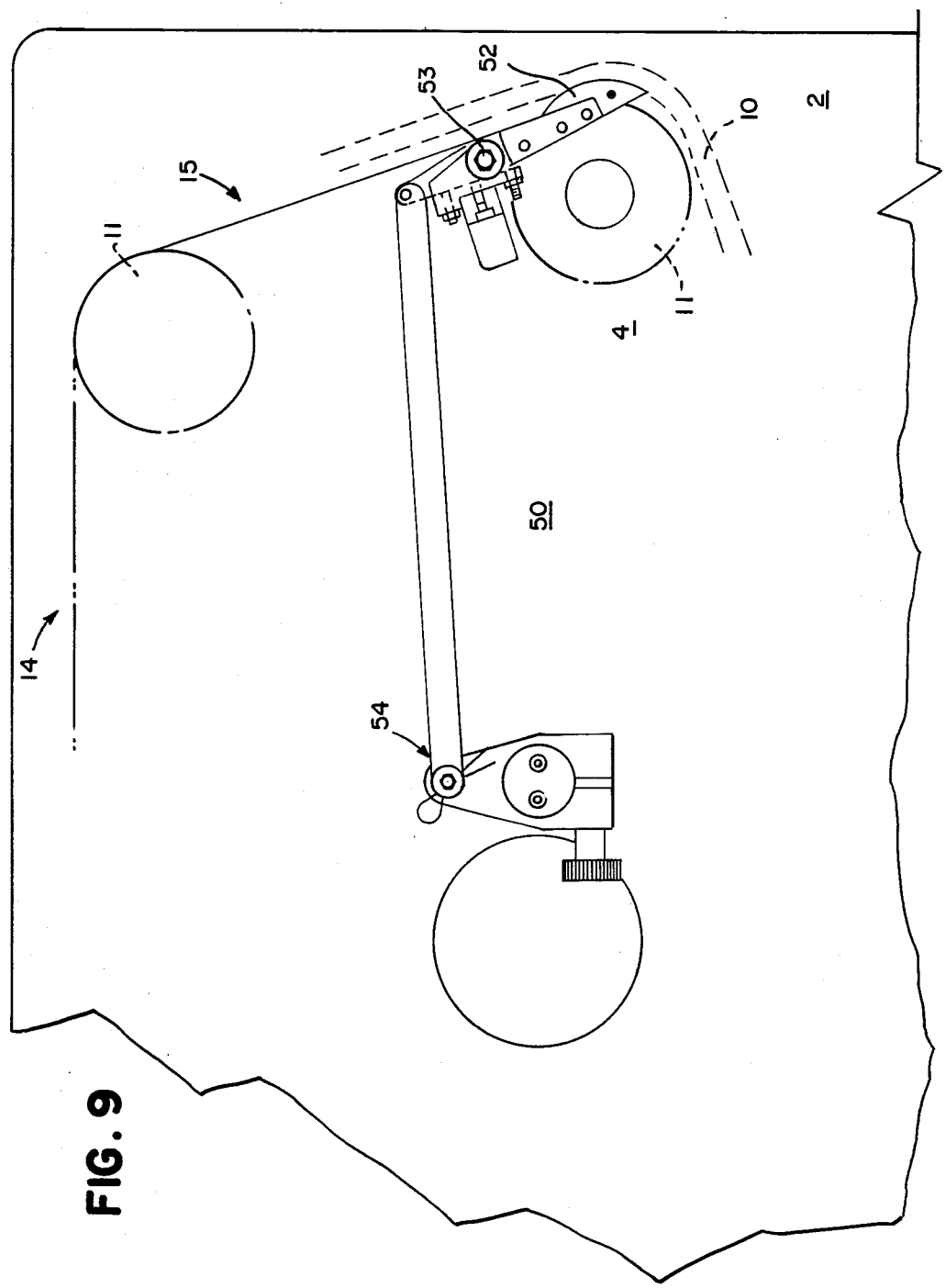
FIG. 9 is a partial, side elevational view of a knockout mechanism for use in connection with the carrier bars of FIGS. 5 and 6.

This configuration also has the beneficial effect of facilitating discharge of the pellets from the pockets 40, at 16, under the influence of gravity. However, under certain extreme conditions such as increased temperature, the use of relatively sticky pellet coatings, or even overspray resulting from the ink used in the marking process, it is conceivable that pellets will at times become caught within the pockets 40 (or the pockets 25), preventing their reliable discharge at 16. An air jet may be provided, if desired, to assist in removal of the pellets from the pockets 25, 40 of the carrier bars 12, and to assist in drying of the ink applied to the pellets. However, to provide positive assurances that the pellets are effectively discharged from their respective pockets 25, 40, the marking apparatus 1 is preferably provided with a knock-out mechanism 50, as shown in FIG. 9, which operates in combination with a series of slots 51 provided in the carrier bars 12, as shown in FIGS. 5 and 6.

The slots 51 are configured to permit a pair of knock-out bars 52 to extend into the pellet receiving pockets 40 of the carrier bars 12, to forceably eject the pellets from the pockets 40. Although stationary knock-out bars may be used for this purpose, to further prevent potential damage or marring of the pellets being processed it is preferred that the knock-out bars 52 reciprocate so as to only briefly and lightly impact the pellets at the discharge 16. To this end, the knock-out bars 52 are pivotally mounted, at 53, to operate responsive to a bell-crank mechanism 54 which is appropriately timed to operation of the marking apparatus 1 to effectively discharge the pellets from the pockets of the carrier bars 12 as the carrier bars 12 pass the discharge 16.

The foregoing operates to convey parallel rows of pellets along the conveyor mechanism 4 and beneath the printing head 6. In accordance with the present invention, the printing head 6 operates to apply indicia to the pellets making use of a printing mechanism which does not contact the pellets, but rather which is spaced from the pellets as the series of pellets progress beneath the printing head 6.

To this end, the printing head 6 incorporates a pair of ink-jet printing heads 55 which are positioned in general alignment with the rows of pockets 25, 40 of the carrier bars 12 so that suitable indicia may be applied to the pellets seated within the pockets 25, 40 as the carrier bars 12 pass beneath the pair of printing heads 55. Although any of a variety of ink-jet printing heads 55 may be selected for this purpose, a printing head which has been found to be particularly useful for this purpose is the "PT 80 Ink-jet Print Head" which is marketed by the Siemens Corporation. This printing head, in combination with an appropriate controller, has been found to provide effective results in accordance with the present invention, while enabling any of a variety of indicia to be applied to the pellets being processed in a simple and straightforward manner. Moreover, since ink-jet printing heads of this type are operated responsive to a microprocessor based controller, the pattern being applied by the printing heads is readily varied without having to change design rolls or the like, as is necessary in connection with conventional contact-type printing methods. In using ink-jet printing heads of this type, it has been found that effective results can be achieved by spacing the outlet of each printing head 55 from the surface of the pellets to be imprinted by a distance on the order of 2 to 10 mm., with 3 to 5 mm. being the preferred spacing for this purpose.

Any of a variety of methods may be used to properly coordinate operation of the ink-jet printing heads 55 (in accordance with signals received from their respect controllers), to assure that the indicia are appropriately applied to the pellets as they pass beneath the printing head 6. For example, one of the sprockets 11 receiving the chain conveyor 10 may be provided with a slotted or apertured timing wheel which, in conjunction with an electro-optical device, may be used to detect (time) the positioning of the carrier bars 12, and the pellets which they contain. Alternatively, an electro-optical device may be positioned ahead of the printing head 6, just over the pockets 25, 40 of the carrier bars 12, to sense the anticipated arrival of pellets beneath the printing head 6. This latter configuration has the added advantage of providing a means for determining whether or not the pockets 25, 40 actually contain a pellet, so that the corresponding ink-jet printing head 55 may be enabled or disabled depending upon the status of the approaching pocket 25, 40.

In either event, proper synchronization between the timing device and the operation of the printing heads 55 operates to effectively and reliably transfer markings to the pellets as they are conveyed beneath the printing head 6. This result is further enhanced when using the configured pockets 40 of FIGS. 7 and 8 since the funneling effect developed by the configured pockets 40 operates to further assure that the pellets are positioned at a known location within the pellet receiving pockets 40, i.e., the foot 44 of the pocket 40, resting upon the bed 45.

As previously indicated, a pair of ink-jet printing heads 55 are mounted in the printing head 6 to correspondingly address each of the rows of pockets 25, 40 which are developed in the carrier bars 12 of the chain conveyor 10. These printing heads 55 may be used to apply similar, or even different indicia to the pellets being processed, as desired. However, due to the close proximity of the pockets 25, 40 of the carrier bars 12, and the relatively large size of the printing heads 55, the printing heads 55 are preferably contained within the printing head 6 in a staggered arrangement to permit appropriate alignment between the printing heads 55 and the pockets 25, 40. Differences in positioning resulting from this staggered relationship are easily accommodated by appropriately compensating the timing scheme previously described, to account for these differences using the controller which operates the printing heads 55.

Referring again to FIGS. 2–4, each of the printing heads 55 are advantageously supplied with ink from a common reservoir 56 associated with the printing head 6. As previously indicated, printing quality and effectiveness will depend upon the distance established between the printing heads 55 and the pellets which are to be marked. Adjustment of this distance, as well as the lateral postioning of the printing heads 55, is enabled by the adjustment knobs 57 which are provided on the front of the printing head 6. A drain 58 may be provided for servicing purposes, if desired.

As previously indicated, placement of the printing head 6 along the horizontal portion 14 of the chain conveyor 10, as previously described, is only one of several placements for the printing head 6. If desired, the printing head 6 could similarly be placed along the inclined portion 13 of the chain conveyor 10, operating in similar fashion. This is permitted because, apart from placement of the ink reservoir, operation of the printing heads 55 is essentially independent of their orientation. It is also possible, and indeed preferable in connection with irregularly shaped (and sized) articles, to place the printing head 6 along the declining portion 15 of the chain conveyor 10. However, in such case, special steps must be taken to assure that the desired indicia are applied as previously described despite the significant decline encountered by the pellets as they traverse the declining portion 15.

To this end, reference is made to FIGS. 10–13, which illustrate the guide 35 in further detail. To enable the ink-jet printing heads 55 of the printing head 6 to access the pellets as they traverse the declining portion 15 of the chain conveyor 10, the guide 35 is provided with a pair of longitudinally extending slots 60. Each of the slots 60 are tapered at 61 (FIG. 12), to effectively receive the ink-jet printing heads 55 so as to achieve their desired spacing from the pellets which proceed beneath the guide 35. The guide 35 is additionally provided with grooves 62 which progress fully along the length of the guide 35 to provide a channel for receiving the indicia which are applied to the pellets as the pellets progress along the declining portion 15 of the chain conveyor 10, to make sure that the ink has sufficient time to dry before encountering a solid surface. This also has the added effect of minimizing marring as the pellets progress along the guide 35.

As is best illustrated in FIG. 11, the guide 35 is fully adjustable to make sure that adequate clearance is provided between the guide 35 and the carrier bars 12 of the chain conveyor 10, to prevent binding and to avoid marring of the pellets being conveyed. Indeed, such adjustment may be used to effectively expose desired surfaces of the pellets to be marked, through the slot 60 of the guide 35, providing an accurate means for regulating the distance between the surface of the pellets and the operative surface of the ink-jet printing heads 55. Such adjustment is preferably accomplished by providing the guide 35 with mountings 63 which are adapted to variably engage a pair of eccentrics 64 associated with the frame 2 of the marking apparatus 1, although any of a variety of adjustment devices may be used for this purpose, if desired.

Placement of the printing head 6 along the declining portion 15 of the chain conveyor 10 has been found to be particularly useful in assuring a controlled application of indicia to the pellets, especially when irregularly shaped (or sized). This results from cooperation between the pockets of the carrier bars 12 and the overlying guide 35. Specifically, to maintain the close tolerances (3 to 5 mm.) which are preferred for an effective application of indicia to the pellets, it is beneficial to take steps to cause the surface of each pellet to be marked to be brought into contact with the inwardly directed face 75 of the guide 35, in general registration with the slot 60. However, in practice this is difficult to maintain, especially when the pellets are irregularly shaped or sized.

Figure 14:
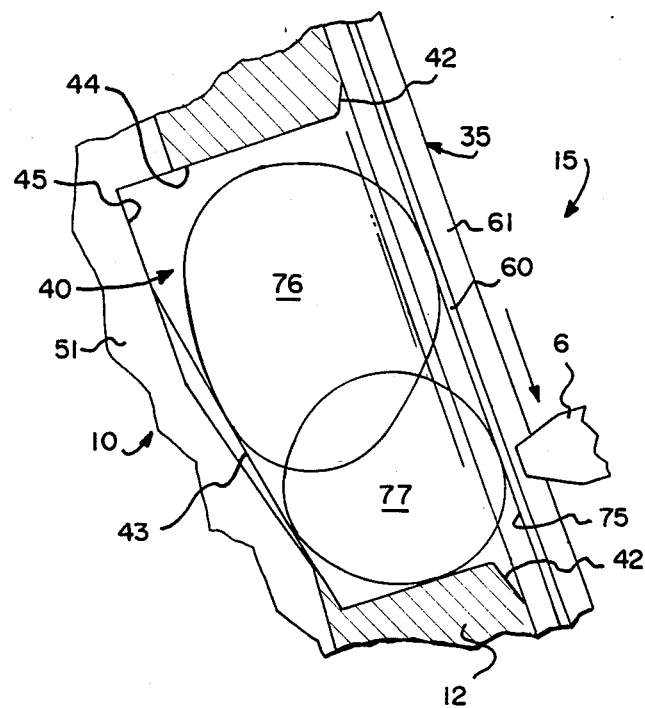
FIG. 14 is a partial, sectional view of portions of the apparatus of FIG. 1, showing the manner in which a pellet-shaped article is received between the pocket of a carrier bar and a guide fitted with an ink-jet printing head in accordance with the present invention.

To this end, and as is best illustrated in FIG. 14, as pockets 40 of the carrier bars 12 traverse the declining portion 15 of the chain conveyor 10, the configured base 43 of each pocket 40 is caused to lead the pocket 40, assuming a generally downwardly directed orientation with respect to the apparatus 1. In this fashion, the slope of the configured base 43 operates to variably receive pellets of different sizes and shapes between the configured base 43 of the pocket 40 and the guide 35 so that the pellets are drawn into appropriate contact with the inwardly directed face 75 of the guide 35. Thus, a relatively large pellet, such as the pellet 76, will be received along the configured base 43 between relatively deep portions of the pocket 40 and the guide 35, while a somewhat smaller pellet, such as the pellet 77, will be received along the configured base 43 between somewhat shallower portions of the pocket 40 and the guide 35. Irrespective of size and shape, the pellet is placed in proper registration with the guide 35, to effectively receive indicia from the printing head 6. A similar, although somewhat less pronounced result will be achieved in connection with the hemispherically-shaped pockets 25 previously described.

Of course, it is apparent that the pellet 76 and the pellet 77 will be longitudinally spaced at different positions within the pocket 40, leading to differences in the timing for the application of indicia to such pellets by the printing head 6. However, this is readily accommodated by the microprocessor-based controller which is used to operate the printing head 6, in otherwise known fashion, when coupled with an appropriate electrooptical device for sensing the positioning of the pellets within the pockets of the carrier bars 12 as previously described.

It will therefore be seen that the foregoing structure operates to effectively apply indicia to pellet-shaped articles, including both regularly and irregularly shaped articles, without necessitating contact between the printing apparatus and the articles to be imprinted. It will also be understood that the foregoing structure is capable of variation without departing from the spirit and scope of the present invention.

For example, the configuration of the conveyor mechanism 4 may be freely varied. The embodiment illustrated in FIGS. 1-13 of the drawings allows placement of the printing head 6 along any of three different portions of the chain conveyor 10, either individually or in plural combinations. However, other conveyor mechanisms may be used, if desired, depending upon the desired placement for the printing head 6. For example, a significantly simplified conveyor mechanism 65 is shown in FIG. 15, which is effectively used in receiving a printing head 6 along its inclined portion 66, downstream from the region which would receive the feed hopper 5. FIG. 16 illustrates a conveyor mechanism 67 which allows the printing head 6 to be positioned either along its inclined portion 68 or its horizontal portion 69. FIG. 17 illustrates a conveyor mechanism 70 which allows the printing head to be positioned either along its inclined portion 71 or its declining portion 72. Other configurations are also possible.

To be noted is that the placement of a printing head 6 along the declining portion 72 of the conveyor mechanism 70 provides the same benefits as did placement of the printing head 6 along the declining portion 15 of the chain conveyor 10. Also to be noted is that similar benefits are achievable by placing a printing head 6 along other sloping portions of the conveyor mechanisms 65, 67, 70, such as the inclined portions 66, 68, 71 (or even the inclined portion 13 of the chain conveyor 10), provided the pockets of the carrier bars are properly oriented (e.g., by reversing the pockets 40 so that their configured bases 43 face in a generally downwardly or declining orientation with respect to the pellet marking apparatus 1 when traversing such inclined portions).

Also capable of variation is the configuration of the carrier bars which are supported by the conveyor mechanism. Some of these modifications have already been discussed. However, it is to be understood that any of a number of different pocket configurations may be used in connection with the carrier bars, and that any number of pockets may be provided across the length of the carrier bars to develop additional rows for applying indicia, as desired.

Also capable of variation are the ink-jet printing heads which are selected for use in connection with the printing head 6, as well as the physical structures which are use to mount and position the printing heads as previously described.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for marking indicia on pellet-shaped articles, comprising:
   a feed hopper for receiving a plurality of said articles;
   conveyor means operatively associated with said feed hopper for receiving said articles from said feed hopper and within a plurality of article receiving pockets, and for conveying said received articles through said apparatus; and
   means for applying said indicia to said articles, operatively associated with sloping portions of said conveyor means to apply said indicia as said articles pass said indicia applying means, without coming into contact with surfaces of said articles, and including a guide and a printing device operatively associated with said guide, wherein said guide includes a slot for permitting communication between said printing device and articles conveyed by said conveyor means, wherein said guide overlies said sloping portions of said conveyor means so that said articles contained within said article receiving pockets are caused to contact said guide to position portions of said articles against said guide and in alignment with said slot to position said articles at a spaced distance from said printing device, and wherein said articles receiving pockets include means for drawing said articles into contact with said guide to position said portions of said articles against said guide for the application of said indicia.

2. The apparatus of claim 1 wherein said indicia applying means is an ink-jet printing device.

3. The apparatus of claim 2 wherein said ink-jet printing device is spaced from the surfaces of said articles by about 2–10 mm.

4. The apparatus of claim 3 wherein said spacing is about 3–5 mm.

5. The apparatus of clam 2 wherein said ink-jet printing device uses an FDA-approved ink.

6. The apparatus of claim 2 wherein said ink-jet printing device is adjustably associated with said conveyor means.

7. The apparatus of claim 2 wherein a plurality of ink-jet printing devices are associated with said conveyor means.

8. The apparatus of claim 7 wherein said plurality of printing devices are associated with a single row of articles to be marked.

9. The apparatus of claim 7 wherein said plurality of printing devices are associated with different rows of articles to be marked.

10. The apparatus of claim 9 wherein said plurality of printing devices are adjacent to one another, and wherein said adjacent printing devices receive ink from a common source.

11. The apparatus of claim 2 wherein said printing device is operated responsive to timing signals produced by said conveyor means.

12. The apparatus of claim 2 wherein said printing device is operated responsive to timing signals produced in accordance with the presence of an article in the vicinity of said printing device.

13. The apparatus of claim 12 wherein said printing device is operated only when an article is present in the vicinity of said printing device.

14. The apparatus of claim 12 wherein the presence of said article is variable in position, and wherein said timing signals compensate for said variable position.

15. The apparatus of claim 1 wherein said feed hopper is associated with inclined portions of said conveyor means, in advance of said printing device.

16. The apparatus of claim 15 wherein the terminating end of said feed hopper includes a brush which rotates in a direction opposite to the direction of movement of said conveyor means.

17. The apparatus of claim 16 wherein said feed hopper and said brush operate to deliver said articles to a plurality of article receiving pockets associated with said conveyor means.

18. The apparatus of claim 17 wherein said apparatus includes vibrator means for seating said articles in said article receiving pockets.

19. The apparatus of claim 15 wherein said article receiving pockets are configured pockets which are sector-shaped.

20. The apparatus of claim 19 wherein portions of said sector-shaped pockets are enlarged to receive said articles from said feed hopper.

21. The apparatus of claim 20 wherein said enlarged portions form trailing portions of said configured pockets as said configured pockets pass said feed hopper.

22. The apparatus of claim 20 wherein said enlarged portions form leading portions of said configured pockets as said configured pockets pass said feed hopper.

23. The apparatus of claim 20 wherein said pockets have a contoured base which progresses downwardly to a floor positioned adjacent to the foot of each sector-shaped pocket.

24. The apparatus of claim 23 wherein said contoured base directs said received articles to the foot of said sectorshaped pockets.

25. The apparatus of claim 1 wherein said guide is adjustably positioned with respect to said conveyor means.

26. The apparatus of claim 1 wherein said guide includes a groove extending in the direction of movement of said articles, and configured to receive printed surfaces of said articles therein.

27. The apparatus of claim 1 wherein said conveyor means includes a plurality of carrier bars for receiving said articles from said feed hopper.

28. The apparatus of claim 27 wherein each of said carrier bars includes a plurality of article receiving pockets for processing parallel rows of said articles.

29. The apparatus of claim 27 wherein said carrier bars have hemispherically-shaped pockets for receiving said articles.

30. The apparatus of claim 29 wherein said means for drawing articles into contact with said guide comprises curved portions of said hemispherically-shaped pockets.

31. The apparatus of claim 27 wherein said carrier bars have configured pockets for receiving said articles.

32. The apparatus of claim 31 wherein said configured pockets are sector-shaped.

33. The apparatus of claim 32 wherein said pockets have a contoured base which progresses downwardly to a floor positioned adjacent to the foot of each sector-shaped pocket.

34. The apparatus of claim 33 wherein marginal portions of said pockets are tapered to the surface of said carrier bars.

35. The apparatus of claim 31 wherein said pockets are configured to receive regularly shaped articles.

36. The apparatus of claim 35 wherein said pockets are configured to position said regularly shaped articles in general alignment with said printing device.

37. The apparatus of claim 31 wherein said pockets are configured to receive irregularly shaped articles.

38. The apparatus of claim 37 wherein said pockets are configured to position said irregularly shaped articles in general alignment with said printing device.

39. The apparatus of claim 27 wherein said carrier bars have pockets for receiving said articles, and slots for communicating with bottom portions of said pockets.

40. The apparatus of claim 39 wherein said apparatus includes means for ejecting articles from said pockets.

41. The apparatus of claim 40 wherein said ejecting means is a bar extending through the slots in said carrier bars.

42. The apparatus of claim 41 wherein said bar is reciprocated to extend into said pockets on an intermittent basis.

43. The apparatus of claim 1 wherein said article receiving pockets are sector-shaped.

44. The apparatus of claim 43 wherein said pockets have a contoured base which progresses downwardly to a floor positioned adjacent to the foot of each sector-shaped pocket.

45. The apparatus of claim 44 wherein marginal portions of said pockets are tapered to the surface surrounding said pockets.

46. The apparatus of claim 43 wherein said pockets are configured to receive regularly shaped articles.

47. The apparatus of claim 46 wherein said pockets are configured to position said regularly shaped articles in general alignment with said printing device.

48. The apparatus of claim 46 wherein said pockets are configured to receive irregularly shaped articles.

49. The apparatus of claim 48 wherein said pockets are configured to position said irregularly shaped articles in general alignment with said printing device.

50. The apparatus of claim 48 wherein portions of said sector-shaped pockets are tapered to confine articles received within said pockets as said articles are conveyed along said sloping portions of said conveyor means.

51. The apparatus of claim 50 wherein said articles form a point contact with said pockets and said guide as said articles are conveyed along said sloping portions of said conveyor means.

52. The apparatus of claim 50 wherein said means for drawing articles into contact with said guide comprises the tapered portions of said sector-shaped pockets.

53. The apparatus of claim 52 wherein said contoured base defines said tapered portions.

54. The apparatus of claim 50 wherein said sloping portions are declining portions of said conveyor means.

55. The apparatus of claim 54 wherein said tapered portions form leading portions of said pockets as said pockets are conveyed along said declining portions.

56. The apparatus of claim 55 wherein said contoured base defines said tapered portions.

57. The apparatus of claim 50 wherein said sloping portions are inclined portions of said conveyor means.

58. The apparatus of claim 57 wherein said tapered portions form trailing portions of said pockets as said pockets are conveyed along said inclined portions.

59. The apparatus of claim 58 wherein said contoured base defines said tapered portions.

60. A process for marking indicia on pellet-shaped articles, comprising the steps of:
   providing means for conveying said articles through said apparatus;
   feeding articles from a feed hopper to a plurality of article receiving pockets associated with said conveying means;
   conveying said articles along sloping portions of said conveying means which include a guide and a printing device operatively associated with said guide, wherein said guide includes a slot for permitting communication between said printing device and articles conveyed by said conveying means, and wherein said guide overlies said sloping portions of said conveying means so that said articles contained within said article receiving pockets are permitted to contact said guide;
   drawing said articles into contact with said guide, causing said articles contained within said article receiving pockets to contact said guide to position portions of said articles against said guide and in alignment with said slot to position said articles at a spaced distance from said printing device; and
   applying said indicia to said articles as said articles are conveyed along said sloping portions of said conveying means, without coming into contact with surfaces of said articles.

61. The process of claim 60 wherein said indicia are applied to said articles with an ink-jet printing device.

* * * * *